Patented Sept. 21, 1943

2,329,824

UNITED STATES PATENT OFFICE 2,329,824

METHOD OF DETERMINING SUITABLE AREAS FOR OIL EXPLORATION

John G. Campbell, Houston, Tex., assignor to Ralph H. Fash, Fort Worth, Tex., as trustee No Drawing. Application December 31, 1940, Serial No. 372,571

3 Claims. (Cl. 250—71)

The invention relates to oil exploration and has particular reference to a method of localizing areas for more intensive oil exploration by analysis of water from said areas to determine their oil content.

The primary object of the invention resides in the provision of a method for localizing areas to be more intensively explored for oil by analysis of waters from said areas to determine their oil content and selecting the favorable areas on the basis of data thus obtained.

In exploring for petroleum oil, advantage has been taken of the presence of oil seeps as indicating the presence of subterranean deposits of oil. The seeps which have been used are visible to the human eye. Where the seeps discharged into a water stream or water well, lenses of oil appeared on the water, or, where the amount of oil was small, a rainbow effect was produced on the water. In my Patent No. 2,227,438, granted January 7, 1941, I describe a method of locating oil deposits by analysis of earth samples wherein sub-microscopic oil seeps are determined by extracting measured dried earth samples with an oil solvent and determining the oil content of the extract by subjecting the extract to the action of ultra-violet light, recording the intensity of the fluorescence produced in the extract by the ultra-violet light, from which I calculate the oil content of the earth sample, thus determining the presence or absence of sub-microscopic oil seeps.

One of the major problems in the exploration for oil is to decide in what area an intensive study should be made. Since the oil-productive area of the world is insignificant compared to the non-productive area, the development of a means of rapidly and inexpensively eliminating from consideration non-productive areas is of paramount importance. The search for oil has been so intensive that practically all the visible oil seeps in the thickly populated countries have been discovered. Various geophysical instruments have been used to narrow the area for intensive study. The cost of this means of exploration is high, being about $10,000.00 per crew per month. Geophysical methods of exploration only locate structure, the presence of a structure not necessarily indicating the presence of oil.

Since the non-productive area of the world far exceeds the productive area of the world, the application of my method of locating sub-microscopic oil seeps by the use of the method given in my previously mentioned copending application necessitates the analyses of many earth samples from non-productive areas in order to locate productive areas. While the cost of exploring for oil by the use of my method of analyzing earth samples is much less than the cost of geophysical exploration, the cost is still rather high. A means which would remove from consideration non-productive areas and indicate the near presence of productive areas is of great economic importance.

I have discovered the fact that water from streams, springs and wells in the vicinity of oil deposits contain oil throughout the body of the water, the quantity of which oil can be determined by subjecting a measured sample of the water to the action of ultra-violet light and measuring the intensity of the fluorescence produced by the action of the light on the oil in the water from which the oil content of the water can be calculated. The oil determined by this method is not the oil which has been heretofore observed on the surface of the water in streams, springs and wells, but is the oil in the body of the water, which oil is invisible to the eye. Water containing this oil may be as clear and transparent as ordinary drinking water. While the human eye can not detect its presence in the water, nevertheless oil is present in waters in the vicinity of oil deposits, which oil can be determined by my process of subjecting the water to the action of ultra-violet light and measuring the intensity of the fluorescence produced by the oil. Because water flows underground for long distances, the oil content of water can not be used for determining the exact location of an oil deposit, but by studying the variations in the oil content of waters, the areas which should be more intensively studied by means of analysis of earth samples in accordance with the procedure given in my Patent No. 2,227,438 can be greatly circumscribed, thus materially reducing the time and expense necessary in locating an oil deposit.

In carrying out my method of determining the oil content of water I have found a convenient method is to place 10 cc. of the sample of water in the ultra-violet transparent cuvette of an instrument used for measuring the intensity of the fluorescent light produced by the action of the ultra-violet light on the cuvette and contents and recording the deflection of a galvanometer needle which is actuated by the electric current produced by the fluorescent light from the cuvette and contents acting on a photo-electric cell. Since the intensity of the fluorescent light produced by the action of ultra-violet light is proportional to the oil content of the water, by calibrating the galvanometer by means of known solutions of petroleum oil in oil solvents placed in the cuvette in the instrument, the oil content of the water can be determined.

While we use standard solutions of petroleum oil to calibrate the galvanometer because the fluorescent effect with which we are concerned is that produced by the oil extracted from the samples, the galvanometer readings themselves can be used directly without converting them into terms of oil because the fluorescent effect produced by the oil is directly proportional to the oil contained in the extract subjected to the action of the ultra-violet light. Likewise, the galvanometer could be calibrated in terms of other fluorescent substances such as quinine sulphate and the variations in the fluorescence could be expressed in terms of this material. In any case, the variations in the intensity of the fluorescent light is due to variations in the oil content of the extract and hence of the sample being analyzed.

What is claimed is:

1. The method in the exploration for oil to localize the areas to be more intensively explored, which consists in analyzing measured samples of water taken from streams, springs or wells in said areas by subjecting each measured sample to ultra-violet light, determining the content of the oil contained in the body of the liquid sample by measuring the intensity of the resulting fluorescent effect, and then selecting the favorable areas on the basis of the data thus obtained.

2. The method in the exploration for oil to localize the areas to be more intensively explored, which consists in analyzing measured samples of water taken from streams, springs or wells in said areas by subjecting each measured sample to ultra-violet light, to cause any oil contained in the body of the liquid sample to fluoresce, determining the said oil content of the sample on the basis that the intensity of the fluorescence is in direct proportion to the oil content, and then selecting the favorable areas on the basis of the data thus obtained.

3. The method in the exploration for oil to localize the areas to be more intensively explored, which consists in analyzing waters from said areas for oil contained in the body of the liquid and invisible to the human eye, said analysis including the step of subjecting a measured sample of said water to ultra-violet light to cause any oil in the body of the sample to fluoresce, determining the oil content of the sample on the basis that the intensity of the fluorescence is in direct proportion to the oil content, and then selecting the favorable areas on the basis of the data thus obtained.

JOHN G. CAMPBELL.